United States Patent
Dyer et al.

(10) Patent No.: US 11,422,558 B2
(45) Date of Patent: Aug. 23, 2022

(54) CONTEXT AWARE STOPPING FOR AUTONOMOUS VEHICLES

(71) Applicant: Waymo LLC, Mountain View, CA (US)

(72) Inventors: John Wesley Dyer, Los Altos, CA (US); Luis Torres, San Francisco, CA (US); Michael Epstein, Danville, CA (US); Guillaume Dupre, San Francisco, CA (US); Joshua Seth Herbach, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 214 days.

(21) Appl. No.: 16/815,751

(22) Filed: Mar. 11, 2020

(65) Prior Publication Data

US 2020/0264612 A1 Aug. 20, 2020

Related U.S. Application Data

(63) Continuation of application No. 15/683,028, filed on Aug. 22, 2017, now Pat. No. 10,627,815.

(51) Int. Cl.
*B60W 60/00* (2020.01)
*G05D 1/00* (2006.01)
(Continued)

(52) U.S. Cl.
CPC .......... *G05D 1/0088* (2013.01); *B60W 10/06* (2013.01); *B60W 30/00* (2013.01);
(Continued)

(58) Field of Classification Search
CPC ............... G05D 1/0088; G05D 1/0061; G05D 2201/021; G05D 1/021–1/03;
(Continued)

(56) References Cited

U.S. PATENT DOCUMENTS 8,874,301 B1 10/2014 Rao et al.
9,547,307 B1 1/2017 Cullinane et al.
(Continued)

FOREIGN PATENT DOCUMENTS

CN 206231467 U 6/2017
CN 206231471 U 6/2017
(Continued)

OTHER PUBLICATIONS

Singapore Office Action for Application No. 11202000642 dated Nov. 6, 2020.
(Continued)

*Primary Examiner* — Jeffrey C Boomer
(74) *Attorney, Agent, or Firm* — Botos Churchill IP Law

(57) ABSTRACT

Aspects of the present disclosure relate to context aware stopping of a vehicle without a driver. As an example, after a passenger has entered the vehicle, the vehicle is maneuvered by one or more processors in an autonomous driving mode towards a destination location along a route. The route is divided into two or more stages. A signal is received by the one or more processors. The signal indicates that the passenger is requesting that the vehicle stop or pull over. In response to the signal, the one or more processors determine a current stage of the route based on a current distance of the vehicle from a pickup location where the passenger entered the vehicle or a current distance of the vehicle from the destination location. The one or more processors then stop the vehicle in accordance with the determined current stage.

20 Claims, 19 Drawing Sheets

1300

(51) Int. Cl.
  *G08G 1/00* (2006.01)
  *B60W 10/06* (2006.01)
  *B60W 30/00* (2006.01)
  *B60W 50/10* (2012.01)
  *B60W 30/18* (2012.01)
  *G08G 1/133* (2006.01)

(52) U.S. Cl.
  CPC ...... *B60W 30/18109* (2013.01); *B60W 50/10* (2013.01); *B60W 60/00253* (2020.02); *G05D 1/0061* (2013.01); *G08G 1/202* (2013.01); *B60W 2540/215* (2020.02); *B60W 2556/50* (2020.02); *G05D 2201/0213* (2013.01); *G08G 1/133* (2013.01)

(58) Field of Classification Search
  CPC .................. B60W 30/00; G08G 1/202; G01C 21/34–21/3697
  See application file for complete search history.

(56) References Cited

U.S. PATENT DOCUMENTS

| | | | |
|---|---|---|---|
| 9,547,985 B2 | 1/2017 | Tuukkanen | |
| 9,631,933 B1 | 4/2017 | Aula et al. | |
| 2015/0006005 A1 | 1/2015 | Yu et al. | |
| 2015/0338849 A1* | 11/2015 | Nemec | B60W 30/06 701/25 |
| 2015/0339928 A1 | 11/2015 | Ramanujam | |
| 2016/0116293 A1 | 4/2016 | Grover et al. | |
| 2016/0301698 A1 | 10/2016 | Katara et al. | |
| 2016/0370194 A1 | 12/2016 | Colijn et al. | |
| 2017/0123422 A1 | 5/2017 | Kentley et al. | |
| 2017/0123423 A1* | 5/2017 | Sako | G05D 1/0088 |
| 2018/0061242 A1* | 3/2018 | Bavar | G01C 21/3407 |
| 2018/0089596 A1 | 3/2018 | Hirose et al. | |
| 2018/0113463 A1* | 4/2018 | Iagnemma | G01C 21/3407 |
| 2018/0237012 A1 | 8/2018 | Jammoussi et al. | |
| 2018/0281794 A1* | 10/2018 | Ravichandran | B60K 37/06 |
| 2018/0292829 A1* | 10/2018 | Li | B60W 10/18 |
| 2019/0108468 A1* | 4/2019 | Nguyen | G01C 21/3415 |
| 2019/0144000 A1* | 5/2019 | Hennes | G06Q 50/30 701/23 |

FOREIGN PATENT DOCUMENTS

| | | |
|---|---|---|
| CN | 212750054 U | 3/2021 |
| JP | H0192900 A | 4/1989 |
| JP | 2002312439 A | 10/2002 |
| JP | 2003217096 A | 7/2003 |
| JP | 2006209574 A | 8/2006 |
| JP | 2018030499 A | 3/2018 |

OTHER PUBLICATIONS

Japanese Office Action for Application No. 2020-504003 dated May 20, 2021.
"International Search Report and Written Opinion for PCT Application No. PCT/US2018/047219, dated Dec. 3, 2018", 10 pages.
Notice of Allowance for Japanese Patent Application No. 2020-504003, dated Jul. 1, 2022.

* cited by examiner

CONTEXT AWARE STOPPING FOR AUTONOMOUS VEHICLES

CROSS REFERENCE TO RELATED APPLICATIONS

The present application is a continuation of U.S. patent application Ser. No. 15/683,028, filed Aug. 22, 2017, the disclosure of which is incorporated herein by reference

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

With a typical taxi service, a passenger and vehicle (and/or driver) are assigned to one another, the vehicle stops to allow the passenger to enter, and once safely inside, the vehicle is maneuvered to a destination location, presumably selected by the passenger. Where there is a human driver, the passenger is able to communicate his or her desire to be dropped off at a particular location fairly easily based on the passenger's assessment of the environment of the vehicle. The driver is then able to make a judgment about whether it is safe to stop and let the passenger out. However, in the case of a vehicle without a driver, communicating the passenger's desire to be let out of the vehicle at a particular location (especially when it is not the destination location) is extremely complicated.

BRIEF SUMMARY

One aspect of the disclosure provides a method of stopping a vehicle without a driver, the method comprising, after a passenger has entered the vehicle, maneuvering, by one or more processors, the vehicle in an autonomous driving mode towards a destination location along a route, the route being divided into two or more stages; receiving, by the one or more processors, a signal indicating that the passenger is requesting that the vehicle stop or pull over; in response to receiving the signal, determining, by the one or more processors, a current stage of the route based on (1) a current distance of the vehicle from a pickup location where the passenger entered the vehicle or (2) a current distance of the vehicle from the destination location; and stopping, by the one or more processors, the vehicle in accordance with the determined current stage.

In one example, the determined current stage corresponds to the vehicle being in a parking lot where the passenger entered the vehicle, and stopping the vehicle includes stopping the vehicle at a current location of the vehicle when the signal is received. In this example, the method also includes while the vehicle is stopped, waiting for the passenger to exit and reenter the vehicle. In another example, the determined current stage corresponds to the vehicle being within a predetermined threshold from the pickup location, and stopping the vehicle includes stopping the vehicle at a current location of the vehicle when the signal is received. In this example, while the vehicle is stopped, waiting for the passenger to exit and reenter the vehicle. In another example, the determined current stage corresponds to the vehicle being more than a predetermined threshold from the destination location, and stopping the vehicle includes accessing map information identifying pull over spots where the vehicle is able to stop and allow passengers to exit the vehicle; identifying an available one of the pull over spots; and stopping the vehicle in the available one of the pull over spots. In another example, the determined current stage corresponds to the vehicle being more than a predetermined threshold from the destination location, and the method also includes, prior to maneuvering the vehicle towards the destination, setting the destination location as a destination goal for the vehicle; and setting a current location of the vehicle when the signal is received as a new destination goal for the vehicle, and wherein stopping the vehicle is further based on the new destination goal. In another example, the determined current stage corresponds to the vehicle being within a predetermined threshold from the destination location, and stopping the vehicle includes stopping the vehicle at a current location of the vehicle when the signal is received. In another example, the determined current stage corresponds to the vehicle being within a predetermined threshold from the destination location, and stopping the vehicle includes determining whether the vehicle is already maneuvering to stop, and when the vehicle is determined to be already maneuvering to stop, continuing the maneuvering to the stop and ignoring the signal.

Another aspect of the disclosure provides a system for stopping a vehicle without a driver. The system includes one or more computing devices having one or more processors configured to, after a passenger has entered the vehicle, maneuvering the vehicle in an autonomous driving mode towards a destination location along a route, the route being divided into two or more stages; receive a signal indicating that the passenger is requesting that the vehicle stop or pull over; in response to receiving the signal, determining a current stage of the route based on (1) a current distance of the vehicle from a pickup location where the passenger entered the vehicle or (2) a current distance of the vehicle from the destination location; and stopping the vehicle in accordance with the determined current stage.

In one example, the determined current stage corresponds to the vehicle being in a parking lot where the passenger entered the vehicle, and the one or more processors are also configured to stop the vehicle by stopping the vehicle at a current location of the vehicle when the signal is received. In this example, the one or more processors are also configured to, while the vehicle is stopped, waiting for the passenger to exit and reenter the vehicle. In another example, the determined current stage corresponds to the vehicle being within a predetermined threshold from the pickup location, and the one or more processors are further configured to stop the vehicle by stopping the vehicle at a current location of the vehicle when the signal is received. In another example, the one or more processors are also configured to, while the vehicle is stopped, wait for the passenger to exit and reenter the vehicle. In another example, the determined current stage corresponds to the vehicle being more than a predetermined threshold from the destination location, and the one or more processors are configured to stop the vehicle by accessing map information identifying pull over spots where the vehicle is able to stop and allow passengers to exit the vehicle; identifying an available one of the pull over spots; and stopping the vehicle in the available one of the pull over spots. In another example, the determined current stage corresponds to the vehicle being more than a predetermined threshold from the destination location, and the one or more processors are further configured to, prior to maneuvering the vehicle towards the destination, set the destination location as a destination goal for the vehicle, and set a current location of the vehicle when the signal is received as a new destination goal for the vehicle, and stopping the vehicle is further based on the new destination goal. In another example, the determined current stage corresponds to the vehicle being within a predetermined threshold from the destination location, and the one or more processors are further configured to stop the vehicle by stopping the vehicle at a current location of the vehicle when the signal is received. In another example, the determined current stage corresponds to the vehicle being within a predetermined threshold from the destination location, and stopping the vehicle includes determining whether the vehicle is already maneuvering to stop, and when the vehicle is determined to be already maneuvering to stop, continuing the maneuvering to the stop and ignoring the signal. In another example, the system also includes the vehicle.

A further aspect of the disclosure provides a non-transitory computer-readable medium on which instructions are stored. The instructions, when executed by one or more processors cause the one or more processors to perform a method of stopping a vehicle without a driver. The method includes after a passenger has entered the vehicle, maneuvering the vehicle in an autonomous driving mode towards a destination location along a route, the route being divided into two or more stages; receiving a signal indicating that the passenger is requesting that the vehicle stop or pull over; in response to receiving the signal, determining a current stage of the route based on (1) a current distance of the vehicle from a pickup location where the passenger entered the vehicle or (2) a current distance of the vehicle from the destination location; and stopping the vehicle in accordance with the determined current stage.

DETAILED DESCRIPTION

Overview

Figure 1:
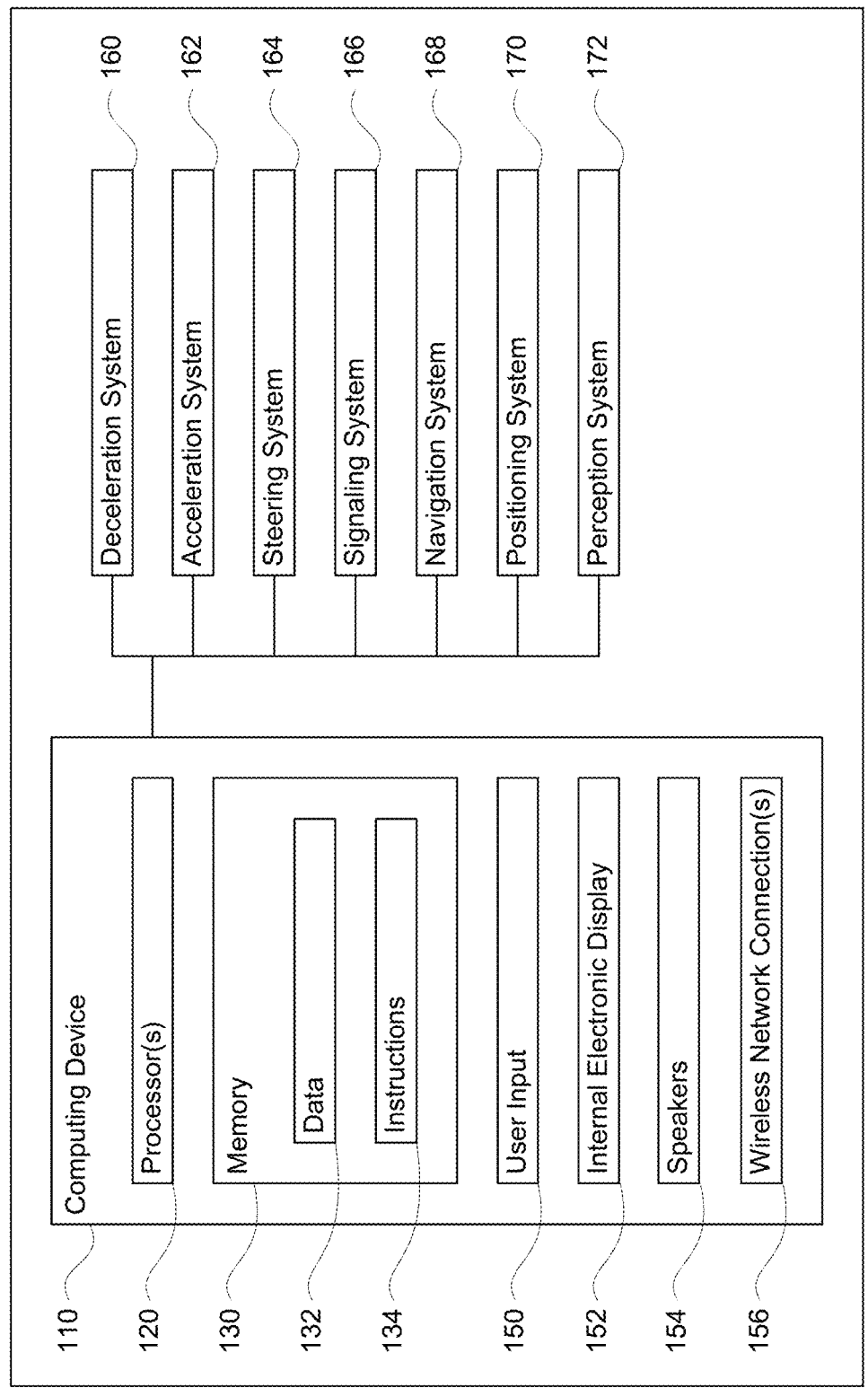
FIG. 1 is a functional diagram of an example vehicle in accordance with an exemplary embodiment.

Aspects of the technology relate to context aware stopping for dropping off passengers in vehicles that do not have a human driver, for instance, autonomous vehicles. As discussed above, this can be challenging due to the absence of a human driver, and safety risks involved.

In one example, a passenger may express intent by pressing a "pull over" or "stop" button in the vehicle and/or on a client device of the passenger. This may send a signal to the computing devices of the vehicle. In response, the computing devices may attempt to pull over at the first available pull over spot along the current route. In some cases, these pull over spots may be predesignated as such in map information used by the computing devices to maneuver the vehicle. In any event, this response may be problematic as it may take some time to find a spot, especially on roads with higher speed limits. Of course, if the computing devices are not able to pull over the vehicle within a short period of time, such as 5 minutes or more or less, the computing devices may then stop the vehicle in a lane (assuming the lane is the farthest to the right in a left hand drive country) or in a shoulder area if possible.

Using the aforementioned button may operate to cause the computing devices to change or update the destination location. For instance, once the passenger uses the button, the computing devices may update the destination location to the vehicle's current location. In such examples, where the computing devices are able to immediately pull over the vehicle, they may do so. If this is not possible, the computing devices may route the vehicle around back towards the updated destination location.

Depending upon how far the vehicle has traveled along a route to the destination location or how far away from the destination location the vehicle is, this information may be used by the computing devices to determine where and how to stop the vehicle and allow the passenger to get out of the vehicle. In this regard, the trip or route may be divided into stages: an early stage, a middle stage, and a late stage.

In the early stage, the computing devices may respond to the passenger using the button by stopping the vehicle immediately in the vehicle's current position. For instance, in response to a signal from the button, the computing devices may give the passenger some time to exit and reenter the vehicle if needed. In some circumstances, the computing devices may only wait for the passenger to reenter the vehicle if the passenger leaves the door of the vehicle open. Again, this may allow the passenger time to get out, retrieve an item, and get back into the vehicle without disrupting the flow of traffic. Alternatively, if the door is closed or if the passenger is gone for an extended period of time, the passenger may be assumed to have cancelled the trip.

If the vehicle has fully merged into a lane of traffic but is more than a second threshold distance away from the destination location, the vehicle may be in the middle stage of a trip. In response to a signal, the computing devices may attempt to find the nearest pull over spot. As an example, this second threshold distance may be 100 meters or 1 minute or more or less. Again, as noted above, the nearest pull over spot may be the nearest available spot identified from the map information. Once pulled over, the computing devices may indicate to the passenger that it is time to exit the vehicle and allow the passenger to exit the vehicle.

If the vehicle is within a second threshold distance from the destination location, the vehicle may be in late stage of the route. The response of the computing devices to the passenger using the button at this stage may depend on whether the computing devices have already identified a pull over spot and are attempting to maneuver the vehicle into that pull over spot. If so, the computing devices may "ignore" the signal from the button and continue to pull the vehicle into the pull over spot. If not, the computing device may change the destination to the vehicle's current location as discussed above and stop the vehicle in the closest available location to do so under the circumstances. In some cases, this may allow the computing devices to stop the vehicle immediately, again depending on the current circumstances of traffic and the speed limit of the roadway.

The features described herein, which provide for context aware stopping of autonomous vehicles, may allow passengers the ability to get out of a vehicle safely and conveniently prior to reaching a destination. These features also may alleviate some of the burden of the computing devices identifying the exact location of where a passenger wants to get out of a vehicle. Finally, the functionality of allowing a user to end a ride using a button within the vehicle as well as his or her client computing device may increase the feeling of control that the user has while traveling in such vehicles.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information. As discussed further below, these pull over spots may be "hand" selected or identified areas where at which the vehicle is lawfully able to stop and park for some period of time such as shoulder areas, parking spots, parking lots, emergency pull over spots, etc.

Figure 9:
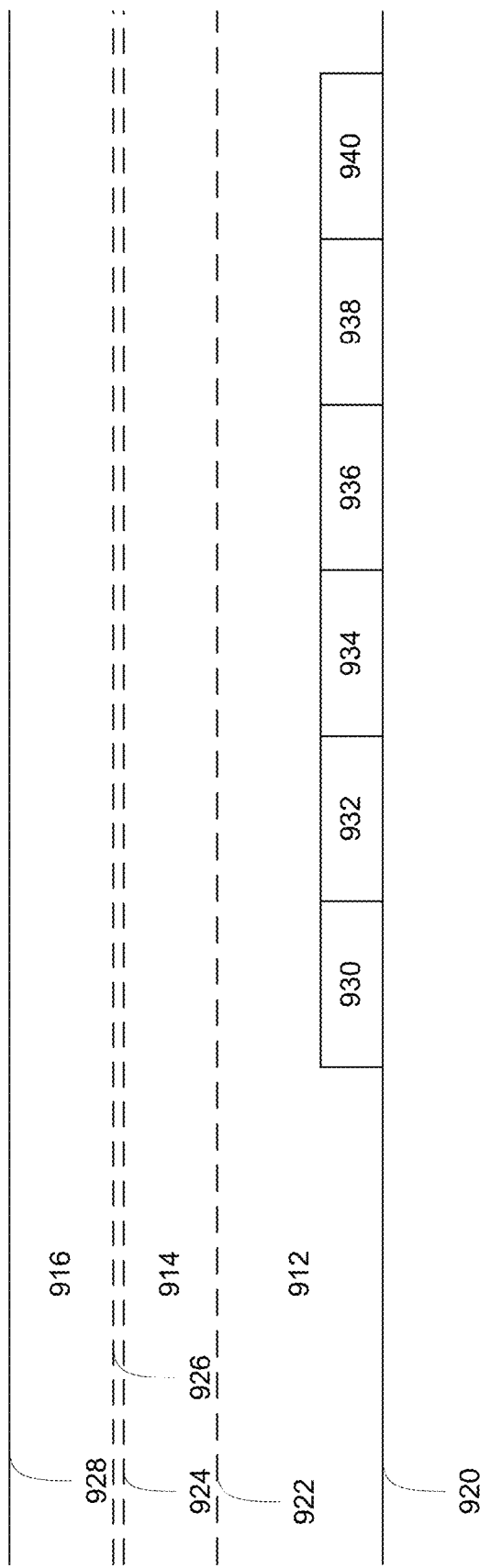
FIG. 9 is an example map in accordance with aspects of the disclosure.

FIG. 9 is an example of map information 900 for a section of roadway. The map information 900 includes information identifying the shape, location, and other characteristics of various road features. In this example, the map information includes three lanes 912, 914, 916 bounded by curb 920, lane lines 922, 924, 926, and curb 928. Lanes 912 and 914 have the same direction of traffic flow (in an eastward direction), while lane 916 has a different traffic flow (in a westward direction). In addition, lane 912 is significantly wider than lane 914, for instance to allow for vehicles to park adjacent to curb 920. In this regard, the map information 900 also includes a plurality of pull over spots 930-940 identified in the map information. Although the example of map information includes only a few road features, for instance, curbs, lane lines, and lanes, given the nature of the roadway of map information 900, the map information may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
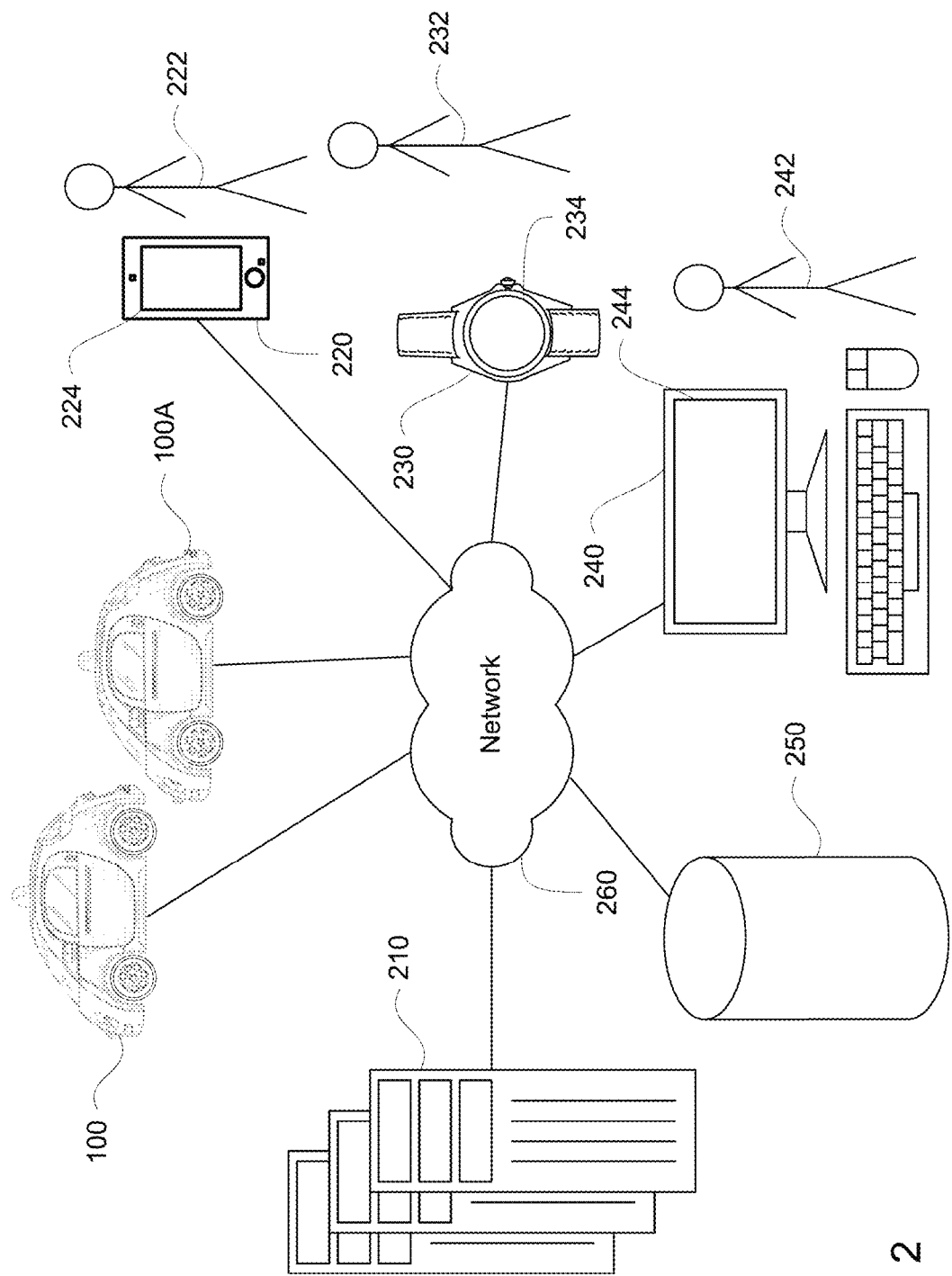
FIG. 2 is a functional diagram of an example system in accordance with an exemplary embodiment.
Figure 3:
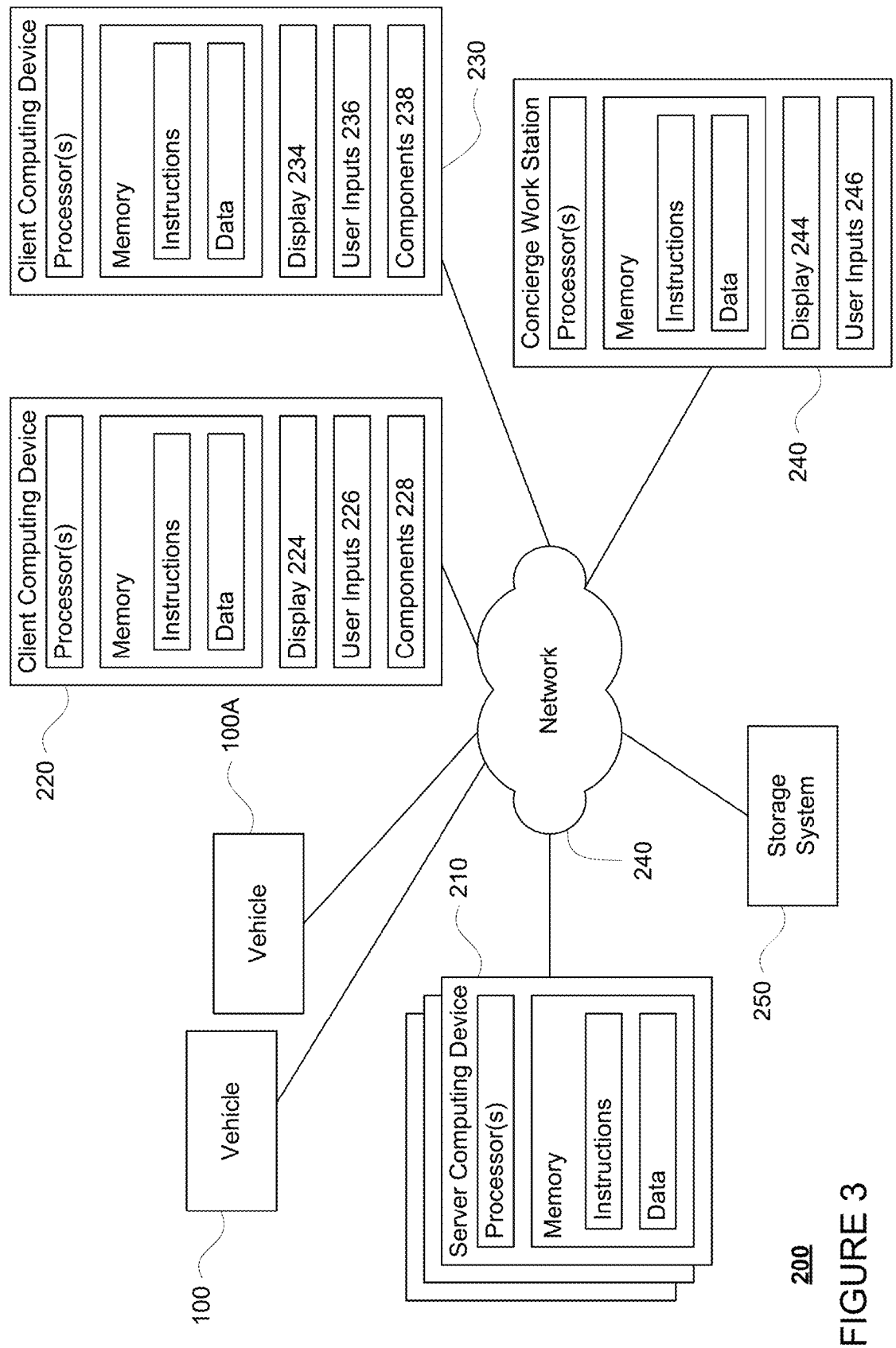
FIG. 3 is a pictorial diagram of the system of FIG. 2 in accordance with aspects of the disclosure.
Figure 4A:
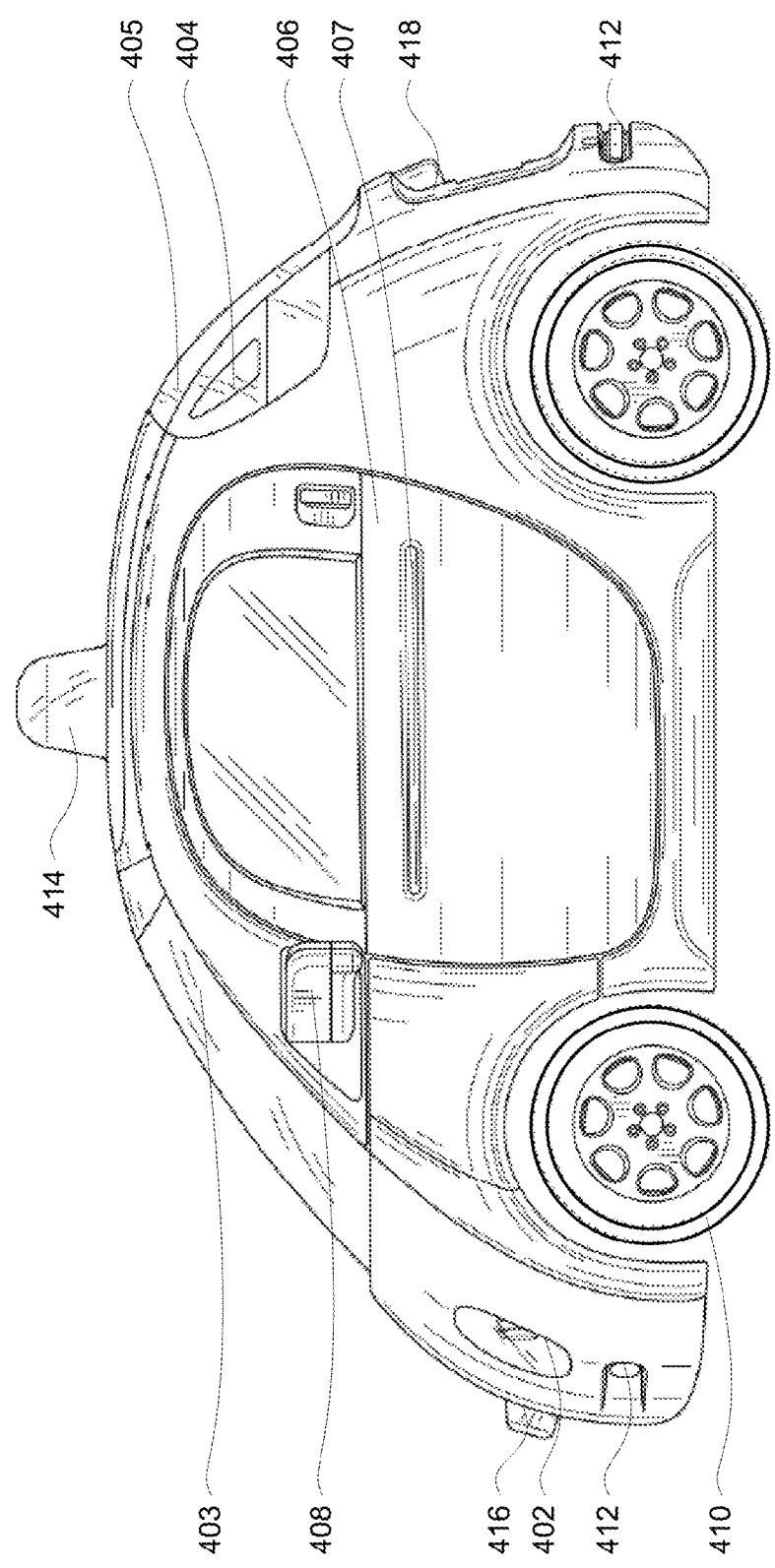
FIGS. 4A-4D are example external views of a vehicle in accordance with aspects of the disclosure.
Figure 4C:
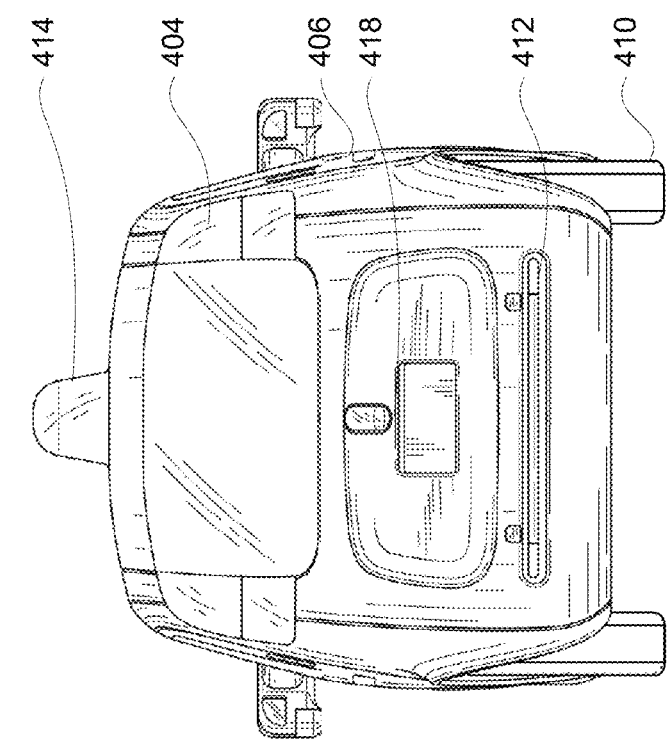
Figure 4B:
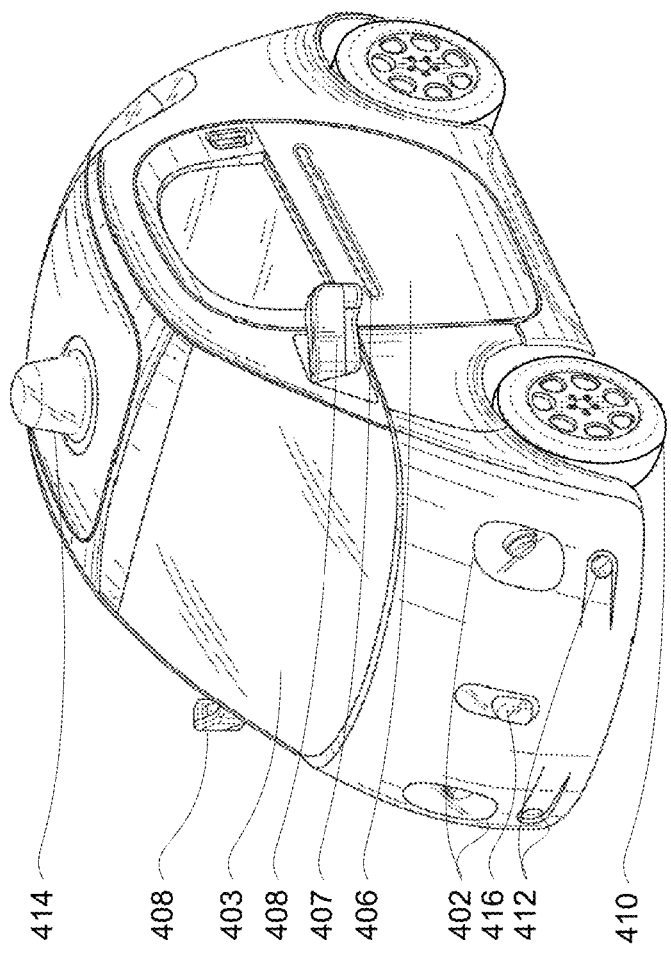
Figure 4D:
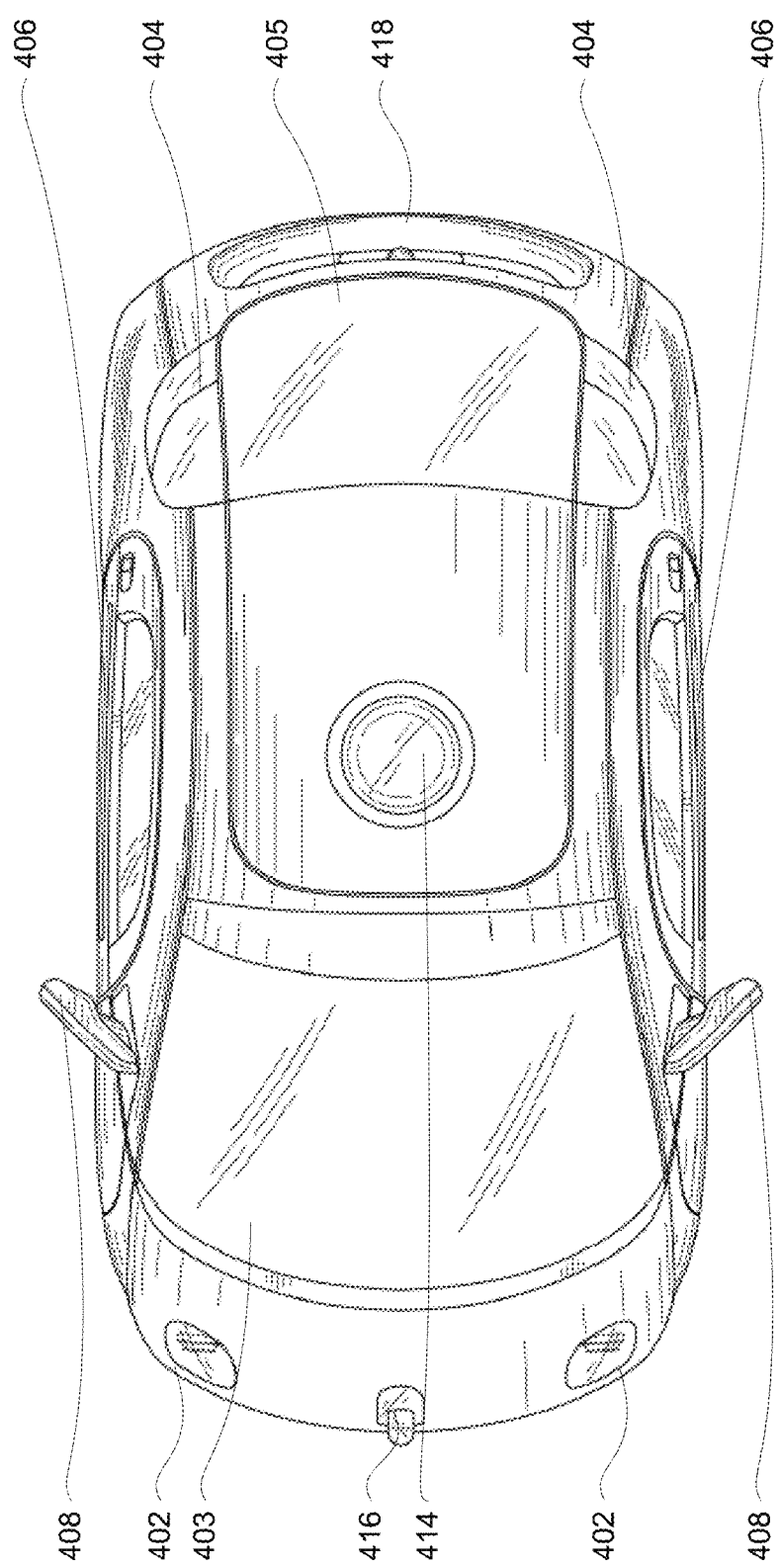

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as users 222, 232, 242 on a display, such as displays 224, 234, 244 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touchscreen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a wrist watch in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2 and/or may be directly connected to or incorporated into any of the computing devices 110, 210, 220, 230, 240, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the perception system 172. For example, housing 414 may include one or more laser devices for having 360 degree or narrower fields of view and one or more camera devices. Housings 416 and 418 may include, for example, one or more radar and/or sonar devices. The devices of the perception system may also be incorporated into the typical vehicle components, such as taillights/turn signal lights 404 and/or side view mirrors 408. Each of these radar, camera, and lasers devices may be associated with processing components which process data from these devices as part of the perception system 172 and provide sensor data to the computing device 110.

Figure 5:
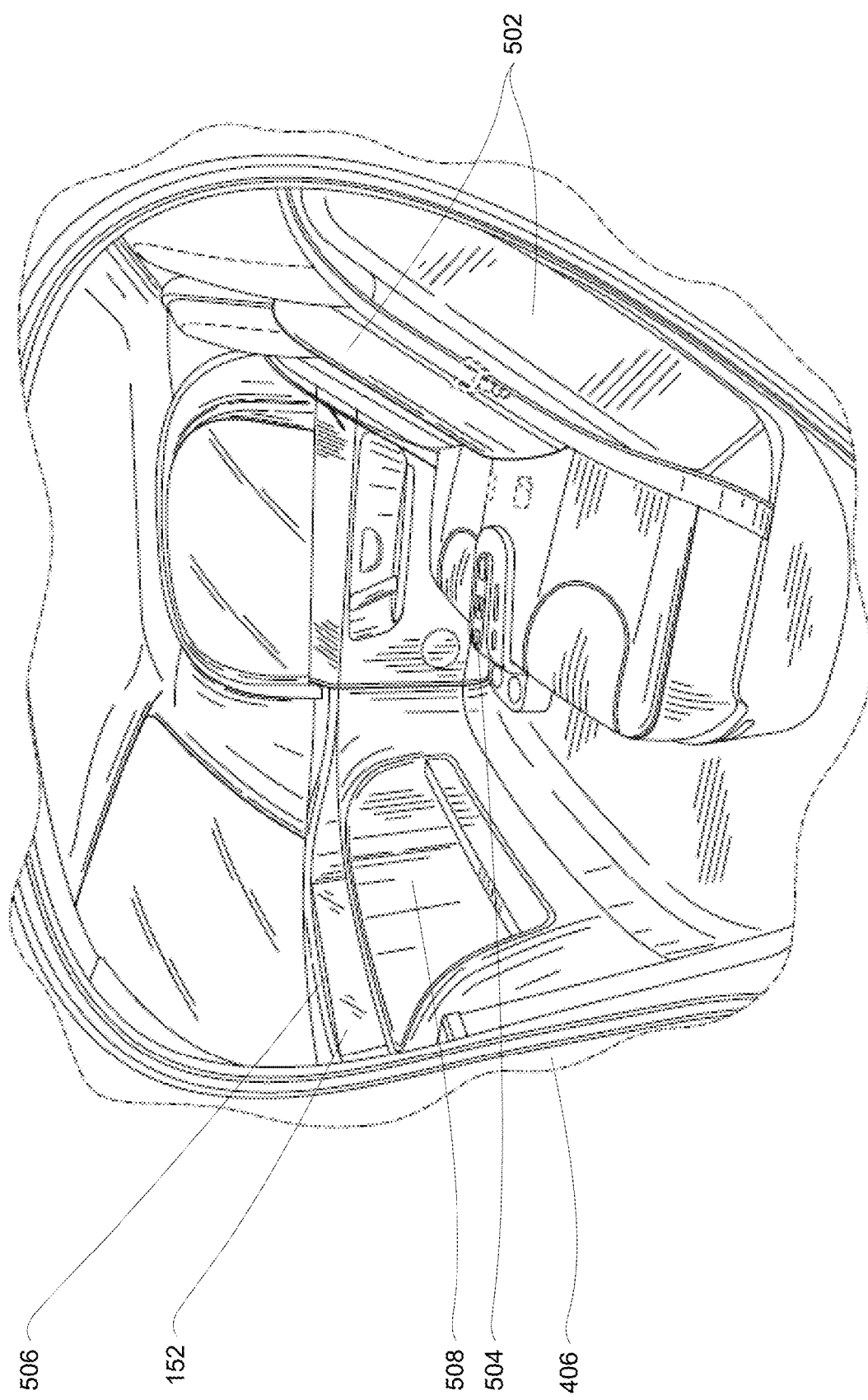
FIG. 5 is an example internal view of a vehicle in accordance with aspects of the disclosure.

FIG. 5 is an example internal view of vehicle 100 through the opening of door 406. In this example, there are two seats 502 for passengers with a console 504 between them. Directly in ahead of the seats 502 is a dashboard configuration 506 having a storage bin area 508 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 6:
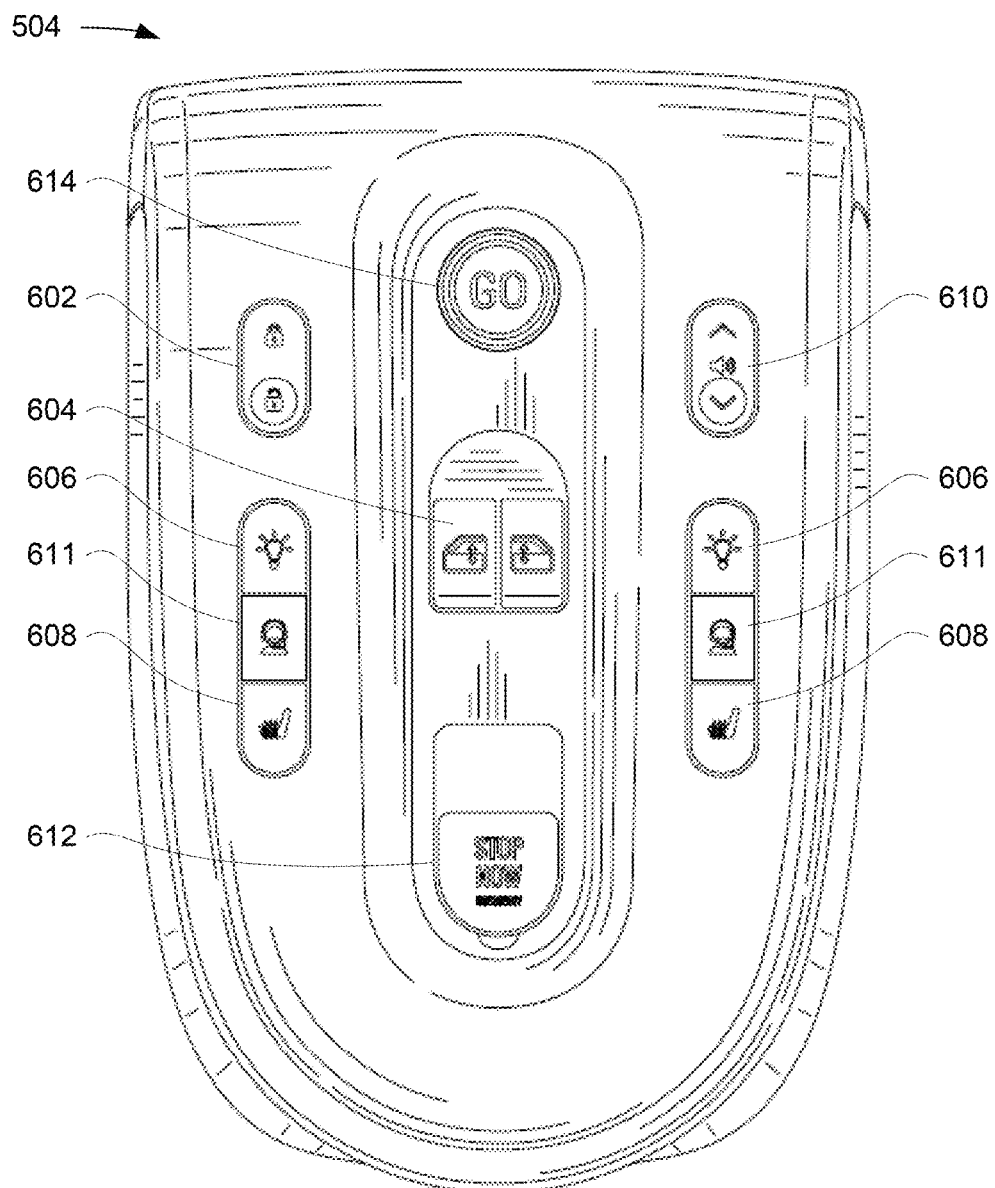
FIG. 6 is an example of a console of a vehicle in accordance with aspects of the disclosure.

FIG. 6 is a top down view of the console 504. Console 504 includes various buttons for controlling features of vehicle 100. For example, console 504 includes buttons that may be found in a typical vehicle such as buttons 602 for locking and unlocking the doors 406, buttons 604 for raising or lowering the windows of doors 406, buttons 606 for turning on internal lights of the vehicle, buttons 608 for controlling a heating function of seats 502, as well as buttons 610 for controlling the volume of speakers 154.

In addition, console 504 also includes buttons 611 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 612 and 614 may also be a part of user input 150 and in this regard, allow a passenger to communicate with computing device 110, for example, to initiate or end a trip in the vehicle. In this regard, button 612 may act as an emergency stopping button that, when pushed, causes vehicle 100 to stop in a short amount of time. Because the passenger does not have direct control of the acceleration or deceleration of vehicle 100 by way of a gas or brake pedal, button 612 may be an emergency stop button that is critical to allowing a passenger to feel safe and act quickly in case of an immediate emergency. In addition, because of the potentially abrupt nature of a stop initiated by the emergency stopping button 612, the emergency stopping button 612 may feature a cover (e.g., a clear plastic cover) that may have to be removed or flipped up in order to activate button 612.

Figure 7:
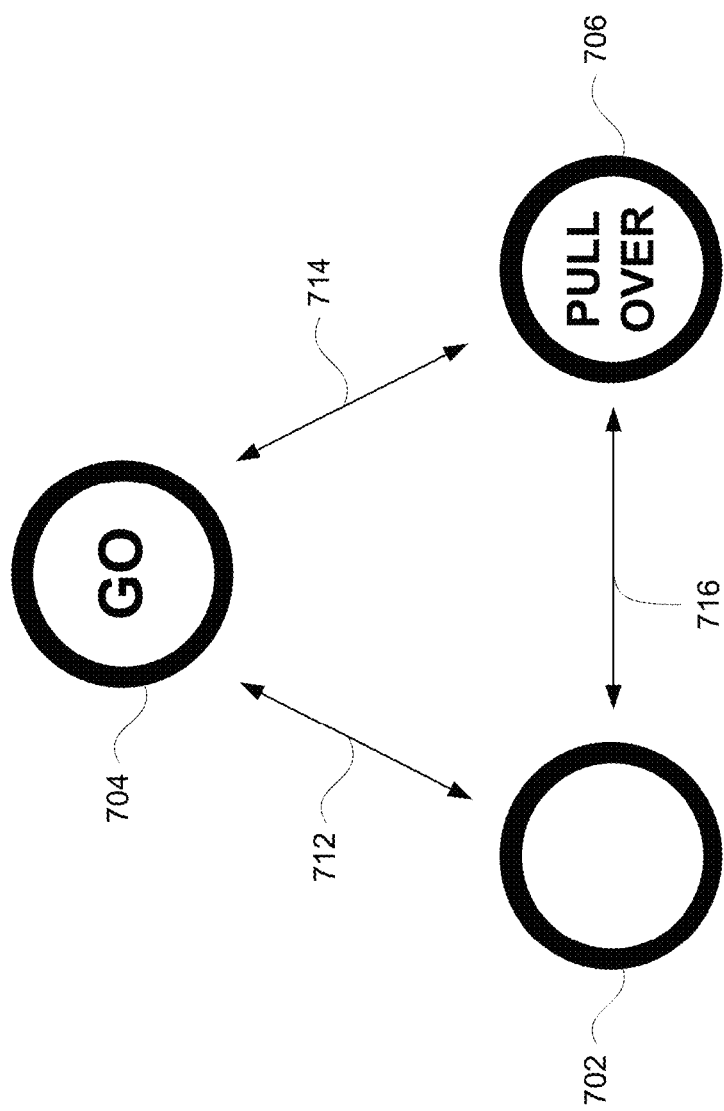
FIG. 7 is an example of states of a button in accordance with aspects of the disclosure.

Button 614 may be a multi-function button. For example, FIG. 7 provides examples of the same button; here button 614, in three different states. In the first state 702, button 614 is inactive, that is, if pressed, the computer devices 110 would not respond by taking any particular action with regard to controlling the movement of the vehicle. However, even in this inactive state, the computing devices 110 may provide a passenger with some visual or audible feedback to indicate that the button is pressed. As an example, this feedback may indicate that the computer recognizes that the button was pressed or otherwise activated, but that button is currently inactive and the vehicle will not respond by maneuvering the vehicle in any particular way (e.g., not starting a trip or pulling over).

In the second state 704, when the vehicle is ready to begin a trip, the button 614 may change to a "GO" button which a passenger uses to initiate a trip to a destination or drop off location. Once vehicle 100 is moving, button 614 may change to a third state 706, where the button 614 is a "PULL OVER" button which a passenger users to initiate a non-emergency stop. In this regard, computer 110 may respond by determining a reasonable place to pull the vehicle over, rather than coming to a more sudden stop as with the emergency stop button 612. Arrows 712, 714, and 716 indicate that the states need not be displayed only in the order of first, second third, but may switch from second to first, third to first, third to second, etc. as dictated by the needs of computer 110.

In addition or alternatively, rather than having a single multipurpose button, such as button 614, two buttons with different states of activation may be used. In this regard, a first button may have an inactive state and an active or "GO" state which enables a passenger to initiate a trip to a destination or drop off location. A second button may have an inactive state and an active or "PULL OVER" state which enables a passenger to initiate a non-emergency stop. In some examples, when the first button is in the active state, the second button is in the inactive state. Similarly, when the second button is in the active state, the first button may be in the inactive state. In some instances, before the vehicle is ready to start a trip to a drop off location, both the first and second buttons may be in the inactive state. In any event, when the vehicle is moving towards a destination location, computing device 110 may respond to a signal from button 614 by determining a safe place to pull the vehicle over, rather than coming to a more sudden stop as with the emergency stop button 612.

Figure 8:
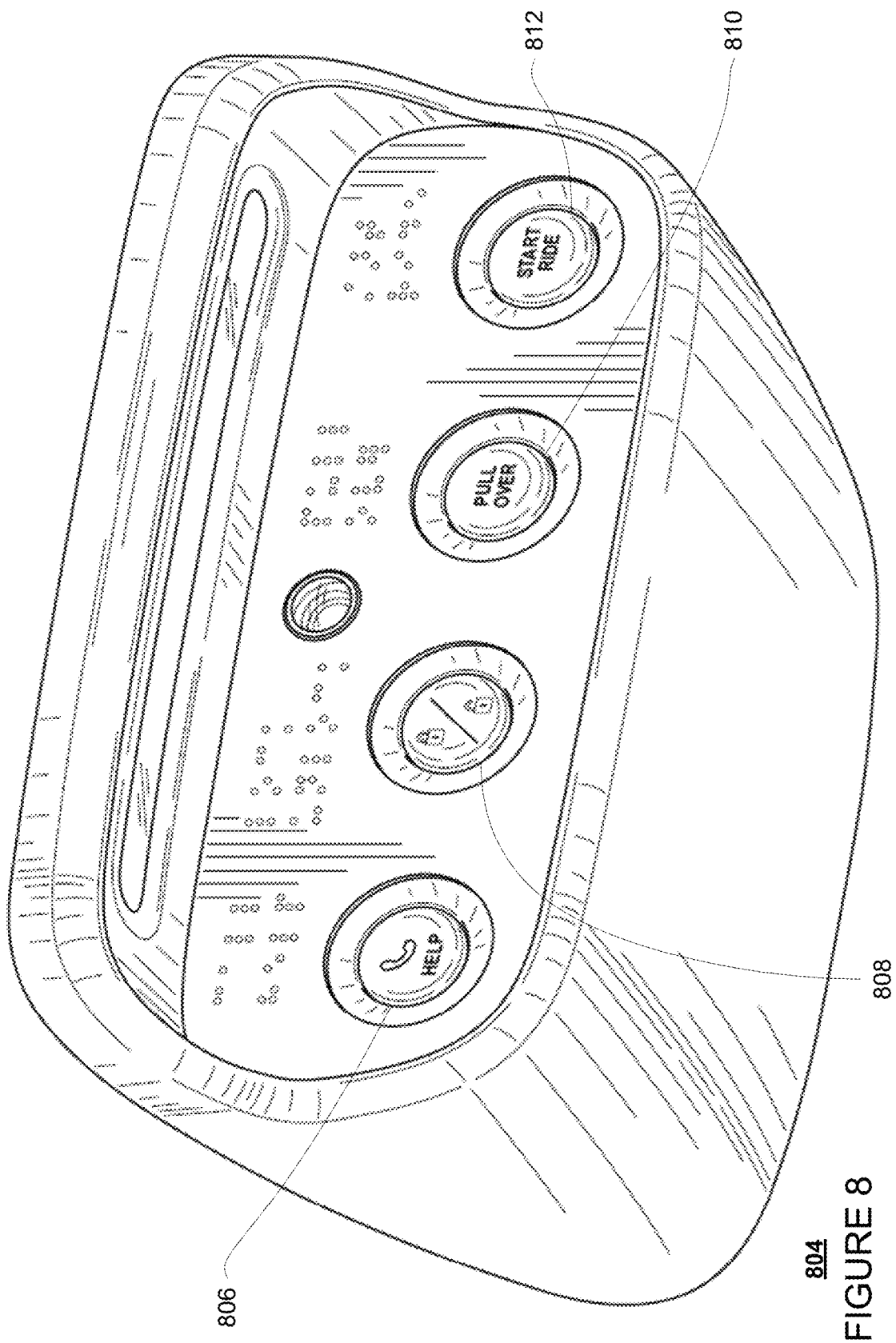
FIG. 8 is an example of another console of a vehicle in accordance with aspects of the disclosure.

Alternatively, two buttons, one having a "GO" state and the other having a "PULL OVER" state may be used. For example, FIG. 8 is a side perspective view of a console 804 having a set of buttons which may be part of user input 150. The set of buttons in this example includes two buttons which can initiate a trip or cause the vehicle to pull over. Console 804 may be positioned on an interior of vehicle 100 at a headliner area (the interior surface of the roof of the vehicle. Console 804 may be used as an alternative to console 504 or in addition to console 504. In this example, console 804 includes buttons 806, 808, 810, and 812. Each of these buttons operates to send a signal to the computing devices 110. In response to the signal from button 806, the computing devices 110 may connect the passenger with a concierge. A signal from button 808 may cause the computing devices 110 to lock or unlock the doors (depending upon the current state of the doors). A signal from button 810 may cause the computing devices to pull the vehicle over, similar to the operation of the button 614 when in the "PULL OVER" state. A signal from button 812 may cause the computing devices to initiate a trip to a destination, similar to the operation of the button 614 when in the "GO" state.

Thus, passenger communication with computing device 110 for navigation purposes may be limited to buttons such as button 614 and emergency stopping button 612 and/or button, wireless network connection 156 (such as Bluetooth LE) with the passenger's client computing device, and by sending information from the passenger's client computing device to the server computing devices 210 which then relays that information to the vehicle's computing device. In some examples, a passenger may provide information to the vehicle's computing device 110 via voice commands through the microphone as discussed above. In addition, however, the passenger may communicate with the concierge via a phone call, an application on the passenger's client computing device, a microphone, and/or the button 611 and in turn, the concierge may provide instructions control certain aspects of a vehicle via a concierge work station.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

The user may then use his or her client computing device to access the application and request a vehicle. As an example, a user such as user 232 may use client computing device 230 to send a request to one or more server computing devices 210 for a vehicle. The request may include information identifying a pickup location or area and/or a destination location or area. As an example, such location may be identified by street addresses, location coordinates, points of interest, etc. In response the one or more server computing devices 210 may identify and dispatch, for example based on availability and location, a vehicle such as vehicle 100 to the pickup location. This dispatching may involve sending information to the vehicle identifying the user (and/or the user's client device), the pickup location, and the destination location or area.

The computing devices 110 may use the information from the server computing devices to identify a pick up location and destination location for an assigned passenger. The computing devices 110 may then maneuver the vehicle towards the pickup location as discussed above. Once the vehicle is some predetermined distance from the pickup location, the computing devices 110 may attempt to stop the vehicle at a location proximate to the pickup location in order to allow the passenger to enter. Once the passenger has entered the vehicle, he or she may be asked to perform some tasks such as buckle a seat belt, close a door, confirm his or her destination as that of the assigned passenger, and initiate a trip to the passenger's destination location. This initiation may be performed, for instance by using button 614 (when in the "GO" state) or button 812. In response to a signal from one of these buttons, the computing devices 110 may begin to maneuver the vehicle 100 towards the destination location for the passenger.

Figure 10:
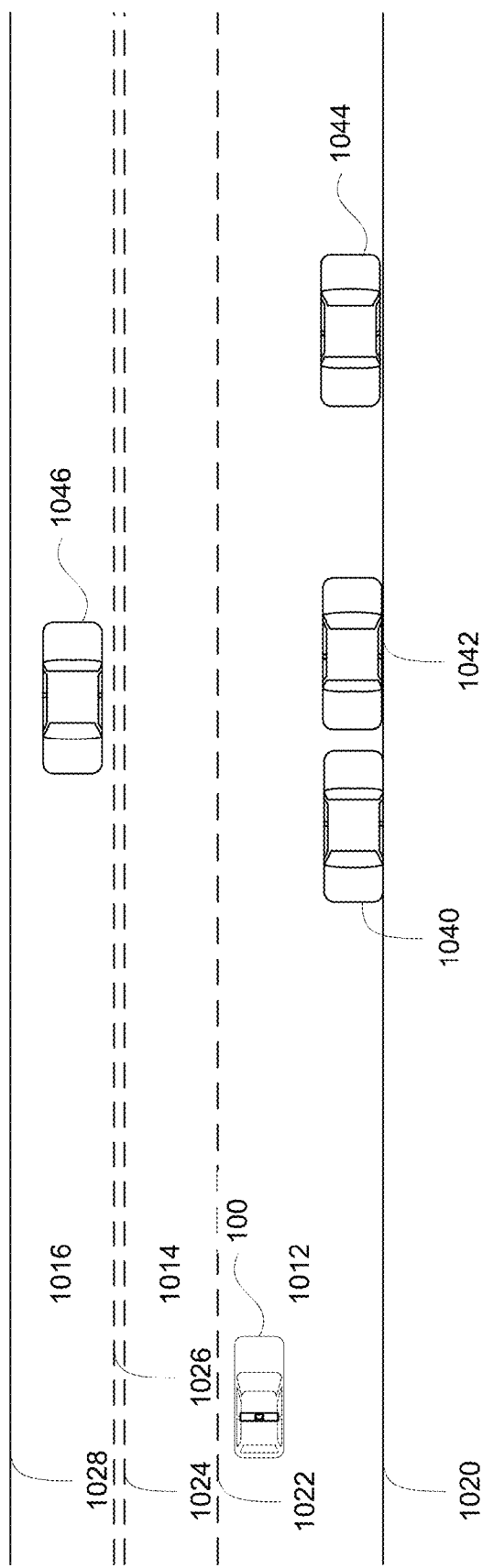
FIG. 10 is an example bird's eye view of a geographic area in accordance with aspects of the disclosure.

FIG. 10 is an example view of vehicle 100 driving along a roadway 1000 corresponding to the map information 900 of FIG. 9. In that regard, lanes 1012, 1014, 1016 correspond to the shape and location of lanes 912, 914, 916, curbs 1020, 1028 correspond to the shape and location of curb 920, and lane lines 1022, 1024, 1026 correspond to the shape and location of lane lines 922, 924, 926, and curb 928. In this example, vehicle 100 is traveling in lane 1012. Vehicles 1040, 1042, and 1044 are parked within lane 1012 along curb 1020, while vehicle 1046 is moving in lane 1016 and vehicle 100 is moving in lane 1011. Because pull over spots 930, 932, 934, 936, 938, 940 merely correspond to a shoulder area where vehicle 100 could lawfully park for some period of time, there is no corresponding "real world" feature included in FIG. 10.

Figure 11:
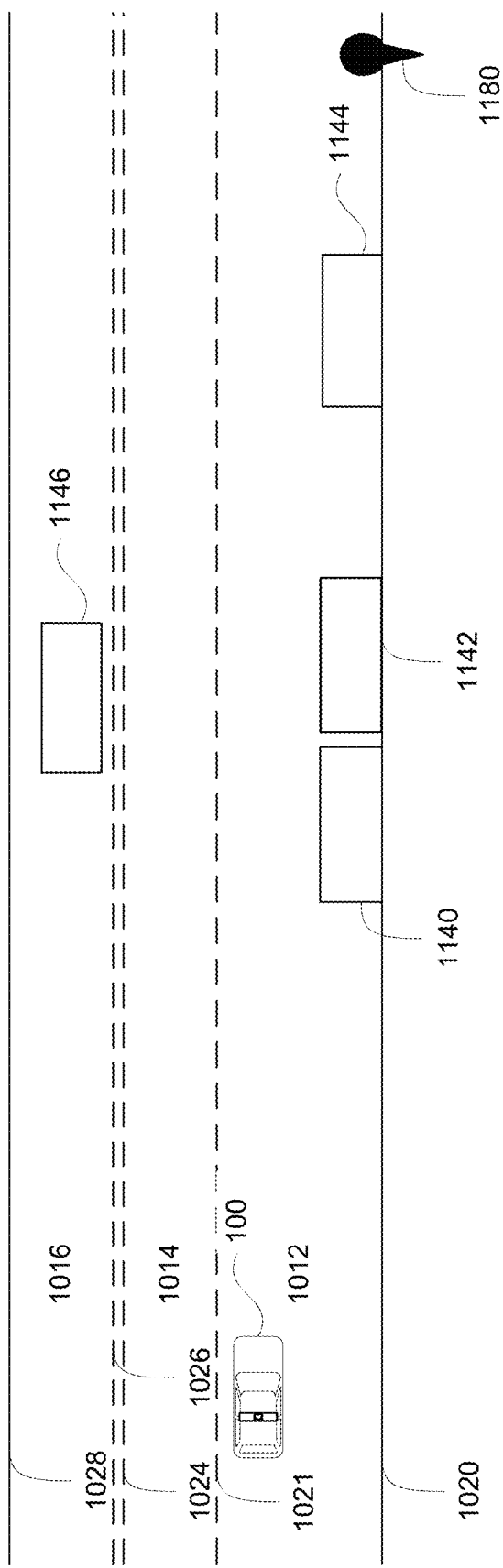
FIG. 11 is an example bird's eye view of a geographic area and data in accordance with aspects of the disclosure.

As the vehicle moves along lane 1012, the perception system 172 provides the computing devices with sensor data regarding the shapes and location of objects, such as curbs 1020, 1028, lane lines 1022, 1024, 1024, as well as vehicles 1040, 1042, 1044, 1046. FIG. 11 depicts sensor data perceived by the various sensors of the perception system 172 when vehicle 100 is in the situation as depicted in FIG. 10 in combination with other information available to the computing devices 110. In this example, vehicles 1040, 1042, 1044, 1046, are represented by bounding boxes for objects 1140, 1142, 1144, 1146 as provided by the perception system 172 to the computing devices 110. Of course, these bounding boxes represent merely a volume of space within which data points corresponding to an object are at least approximately bounded within. In addition, in FIG. 11, the destination location for passenger is represented by a marker 1180.

Along the way to the destination location, represented by marker 1180, a passenger may express intent to stop the vehicle to the computing devices 110 by pressing a button, such as buttons 614 or 810, in the vehicle and/or on a client device of the passenger using the application described above. Although not required, for simplicity, the layout of virtual buttons displayed on a touch-sensitive display of the client computing device may mimic the layout of the buttons of the vehicle in order to give the passenger greater context about what the buttons mean. This may send a signal to the computing devices of the vehicle. In response, the computing devices may attempt to pull over at the first available pull over spot along the current route. As noted above, these pull over spots may be predesignated as such in map information used by the computing devices to maneuver the vehicle. In any event, this response may be problematic as it may take some time to find a spot or may be potentially dangerous to stop in some areas, especially on roads with higher speed limits, such as those greater than 35 miles per hour. Of course, if the computing devices are not able to pull over the vehicle within a short period of time, such as 5 minutes or more or less, the computing devices may then stop the vehicle in a lane (assuming the lane is the farthest to the right in a left hand drive country) or in a shoulder area if possible.

Figure 12:
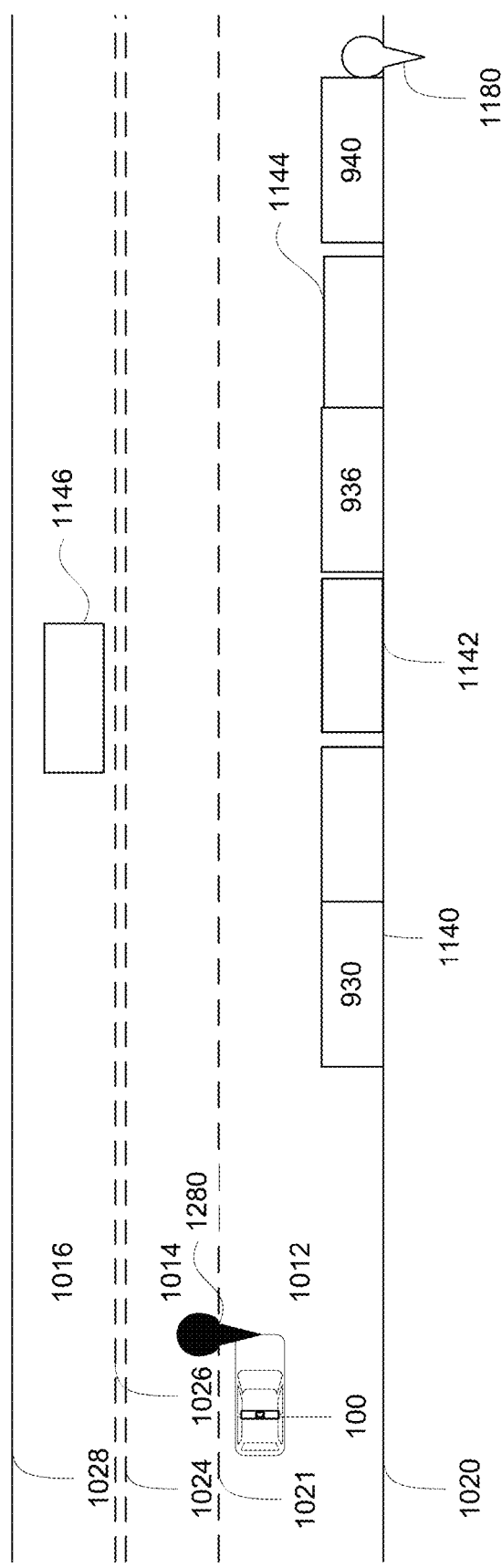
FIG. 12 is another example bird's eye view of a geographic area and data in accordance with aspects of the disclosure.

Using one of buttons 614 or 810 or requesting a pull over using a client device of the passenger, may cause the computing devices to change or update the destination location. For instance, once the passenger uses one of the buttons 614 or 810, the computing devices may update the destination location to the vehicle's current location. In such examples, where the computing devices are able to immediately pull over the vehicle, they may do so. For example, turning to FIG. 12, which combines the example of FIG. 11 with the pull over spots of FIG. 9, a passenger within vehicle 100 may use button 614 or button 810 (or his or her client computing device) to indicate a desire to pull the vehicle over. In response, the computing devices may replace the destination location, represented by marker 1180, with the current location of the vehicle represented by marker 1280. Accordingly, the computing devices 110 may immediately begin looking for an available pull over spot. In the example of FIG. 12, the computing devices 110 may identify pull over spot 930 as the closest available pull over stop and control the vehicle in order to come to a stop within the pull over spot 930. If this is not possible, for instance where no pull over spots are available, the computing devices may, if not blocking other traffic, stop the vehicle in the lane 1012, attempt to find another spot to stop the vehicle on a nearby street, or route the vehicle around back towards the updated destination location. Of course, routing the vehicle around the block could cause the vehicle 100 to loop around continuously if there is no appropriate place to stop.

However, there are many reasons why a passenger may want to exit a vehicle. For instance, the passenger may want to end a trip early (i.e. the passenger is ill or uncomfortable), to stop the vehicle momentarily to get some fresh air, to stop the vehicle to retrieve a misplaced or forgotten item (i.e. left a bag outside of the vehicle), to stop a ride which was started by mistake (i.e. someone mistakenly hit button 614 or 810), or the passenger is attempting to get out just before the vehicle reaches the destination location.

Depending upon how far the vehicle has traveled along a route to the destination location or how far away from the destination location the vehicle is, this information may be used by the computing devices to determine where and how to stop the vehicle and allow the passenger to get out of the vehicle. In this regard, the route may be divided into stages: an early stage, a middle stage, and a late stage.

Figure 13:
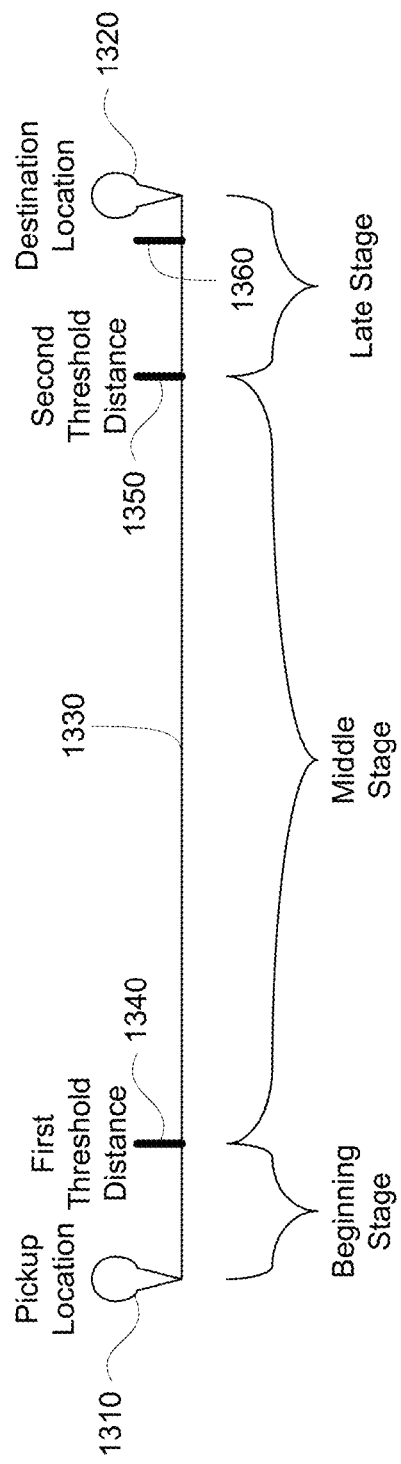
FIG. 13 is an example abstract representation of stages of a trip in accordance with aspects of the disclosure.

FIG. 13 is an example abstract representation 1300 of these stages which provide for context aware stopping of vehicles, such as vehicle 100 (or vehicle 100A). In this regard, FIG. 13 includes markers 1310 and 1320 representing pickup and destination locations for a trip along a route represented by line 1330. The route is divided into a beginning stage between the pickup location and a first threshold distance from the pickup location represented by marker 1340, a middle stage between the first threshold distance and a second threshold distance from the destination location represented by marker 1350, and a late stage between the second threshold distance and the destination location. The late stage can be further subdivided by a marker 1360 representing the point at which the computing devices 110 begin to maneuver the vehicle into a pull over spot in order to allow the passenger to exit the vehicle.

Figure 14:
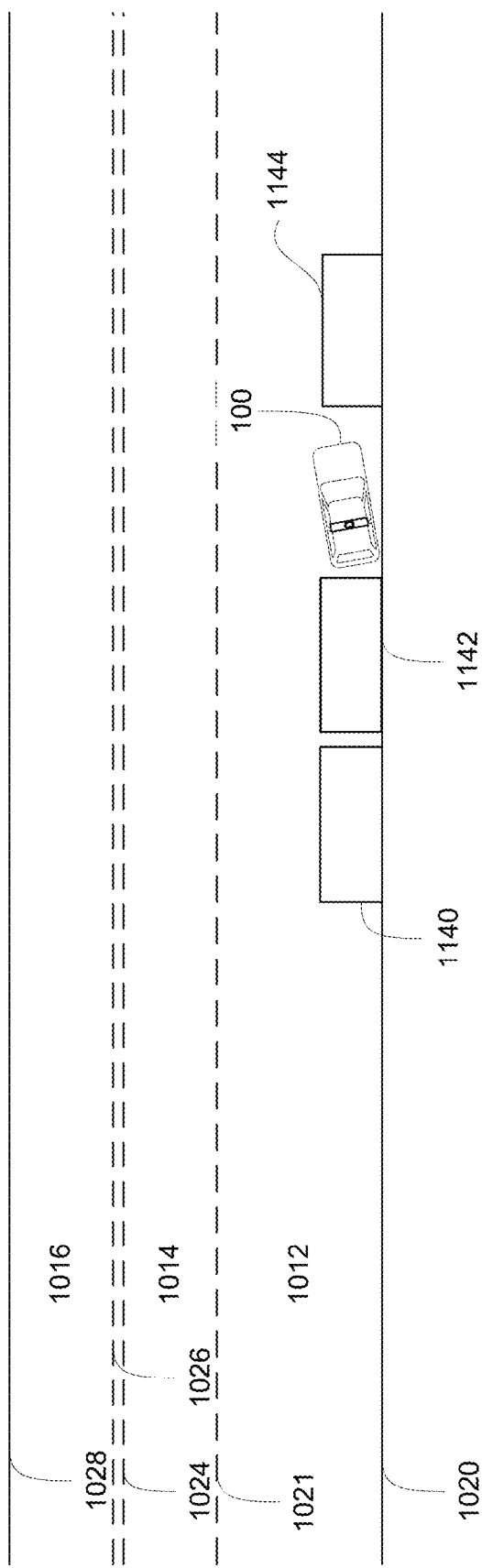
FIG. 14 is a further example bird's eye view of a geographic area and data in accordance with aspects of the disclosure.

In one example, the vehicle may be in an early stage of the trip. For instance, the early stage may correspond to a time when the vehicle is located within a parking lot (i.e. not a lane of traffic), is less than a first threshold distance (in time or space) from where the passenger entered the vehicle (such as a few seconds or a few feet from the pickup location), or before the vehicle has completely pulled away from a parking spot and merged into a lane of traffic and not already blocking the flow of traffic (i.e. not stopped in a lane of traffic), and so on. In response to a signal, the computing devices may respond by stopping the vehicle immediately, or really using an appropriate and comfortable braking pattern so as not to alarm the passenger, in its current position. For example, as shown in FIG. 14, a passenger may have entered vehicle 100 at a pickup location corresponding to the pull over spot 936 of FIG. 9. At this point, the passenger may use button 614 or button 810 (or his or her client computing device) to indicate a desire to pull the vehicle over. In response, because the vehicle is currently still within an early stage of the trip being still located within or at least partially within the area of pull over spot 936, the computing devices 110 may respond to the signal by simply stopping the vehicle in place.

At this point, the computing devices 110 may then give the passenger some time to exit and reenter the vehicle if needed. In some circumstances, the computing devices may only wait for the passenger to reenter the vehicle if the passenger leaves the door of the vehicle open. Again, this may allow the passenger time to get out, retrieve an item, and get back into the vehicle without disrupting the flow of traffic. As one example of this process, if a door of the vehicle is open, the computing devices 110 may wait until the door is closed by the passenger. This may be achieved by using a sensor for the door and relaying the state of the sensor to the computing devices. If the vehicle's doors are closed, and the vehicle is empty, the computing devices 110 may send a notification to the passenger's client computing device indicating that the vehicle will leave in some predetermined period of time (for instance, 2 minutes or more or less) if the passenger does not reenter the vehicle. Alternatively, if the door is closed or if the passenger is gone for an extended period of time, the passenger may be assumed to have cancelled the trip.

In addition or alternatively, the passenger may use the application to request additional time or the computing devices 110 may send a notification to the passenger's client computing device asking if the passenger would like to make a request for additional time. For instance, the notification may be sent as soon as the vehicle is stopped informing the passenger that the vehicle will wait for some predetermined period of time, such as 3 minutes or more or less. In response, the passenger may confirm, request additional time, or indicate that he or she is no longer interested in a trip (i.e. the passenger can effectively cancel the trip).

If the passenger reenters the vehicle, the computing devices may continue to maneuver the vehicle towards the destination location. If the passenger does not reenter after the predetermined period of time, a concierge, such as concierge 242, may check that the passenger has not left anything in the vehicle, for instance using an audible and/or visual connection (i.e. a speaker, microphone, and or/camera). If not, the computing devices 110 move the vehicle to a new location, await instructions from the server computing devices 210, and/or to default to some other non-passenger-serving behavior. If so, the computing devices 110 may also send a notification to the passenger's client computing device (either directly or via the server computing devices 210) indicating that the vehicle will leave in some second predetermined period of time, such as 2 minutes or more or less. After that second predetermined period of time, the concierge 242 may check again, and as long as the passenger did not leave a living thing in the vehicle, send instructions to the computing devices 110 to pull away as noted above.

This first and second predetermined period of time may be adjustable based on the circumstances where the vehicle is currently stopped as well as the reason why the passenger has left the vehicle. For example, less time may be provided where there is a lot of traffic congestion, high demand for dispatching vehicles (i.e. vehicle 100 is needed for another trip), or if the vehicle cannot safely or lawfully remain in its current position. Similarly, if the passenger is sick, he or she may need more time as compared to when the passenger has left an item outside the vehicle. As such, as described above, the passenger may use his or her client computing device to request additional time. These predetermined periods of time may therefore be adjusted accordingly.

Figure 15:
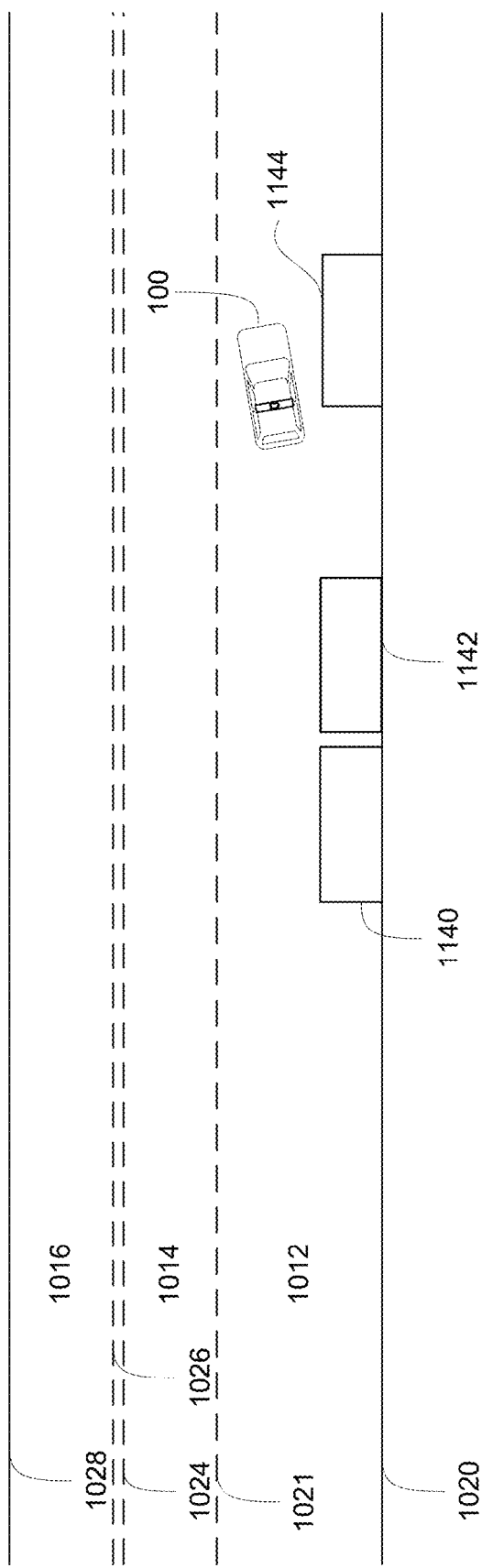
FIG. 15 is a further example bird's eye view of a geographic area and data in accordance with aspects of the disclosure.

If the vehicle has fully merged into a lane of traffic but is more than a second threshold distance away (in time or distance) from the destination location, the vehicle may be in middle stage of the route. As an example, this second threshold distance may be 100 meters or 1 minute or more or less. For example, comparing the example of FIG. 14 with the example of FIG. 15, in FIG. 15, the vehicle 100 has completely pulled out of the pull over spot 936 and is now merged with any traffic in the lane 1012. In addition, a destination location for the passenger within vehicle 100 is greater than the second threshold distance (and thus not shown in FIG. 15). In response to a signal, the computing devices may attempt to find the nearest pull over spot. At this point, computing devices 110 may maneuver the vehicle 100 to pull over into pull over spot 940. Again, as noted above, the nearest pull over spot may be the nearest available spot identified from the map information. Once pulled over, the computing devices may indicate to the passenger that it is time to exit the vehicle and allow the passenger to exit the vehicle.

In order to increase the efficiency at which the computing devices are able to stop the vehicle we may even be allowed to deviate from the route in order to do so, thereby allowing the vehicle to stop on a side road if needed. Similarly, if the vehicle is currently on a high speed road, such as one with a greater than 35 mile per hour speed limit or a highway, the computing devices may exit that road at the first available opportunity and attempt to find a stop at a pull over spot thereafter.

Because such stops in the middle stage of a trip are more likely to be short term where the passenger is likely to return to the vehicle and resume the trip, the computing devices may attempt to find a pull over spot that would allow the vehicle to easily continue towards the destination after the passenger resumes the trip, such as by using button 614, button 810, or the passenger's client computing device. For instance, the computing devices may avoid pulling down a one-way street, onto a dead end road, an exit or entrance ramp, turning at an intersection, turning onto a side street that does not reconnect or takes too long to reconnect to a main thoroughfare, etc. which would increase the time to the destination by more than a minute or more or less. Again, once stopped, the vehicle may operate as in the examples above providing a passenger with notifications warning the passenger that the vehicle may leave or will be leaving in a threshold period of time.

When in this middle stage, if the computing devices are not able to pull the vehicle over within a predetermined time, such as 3 minutes or more or less, the computing devices may make a request to a remote assistance provide for further instructions on how to proceed.

Figure 16:
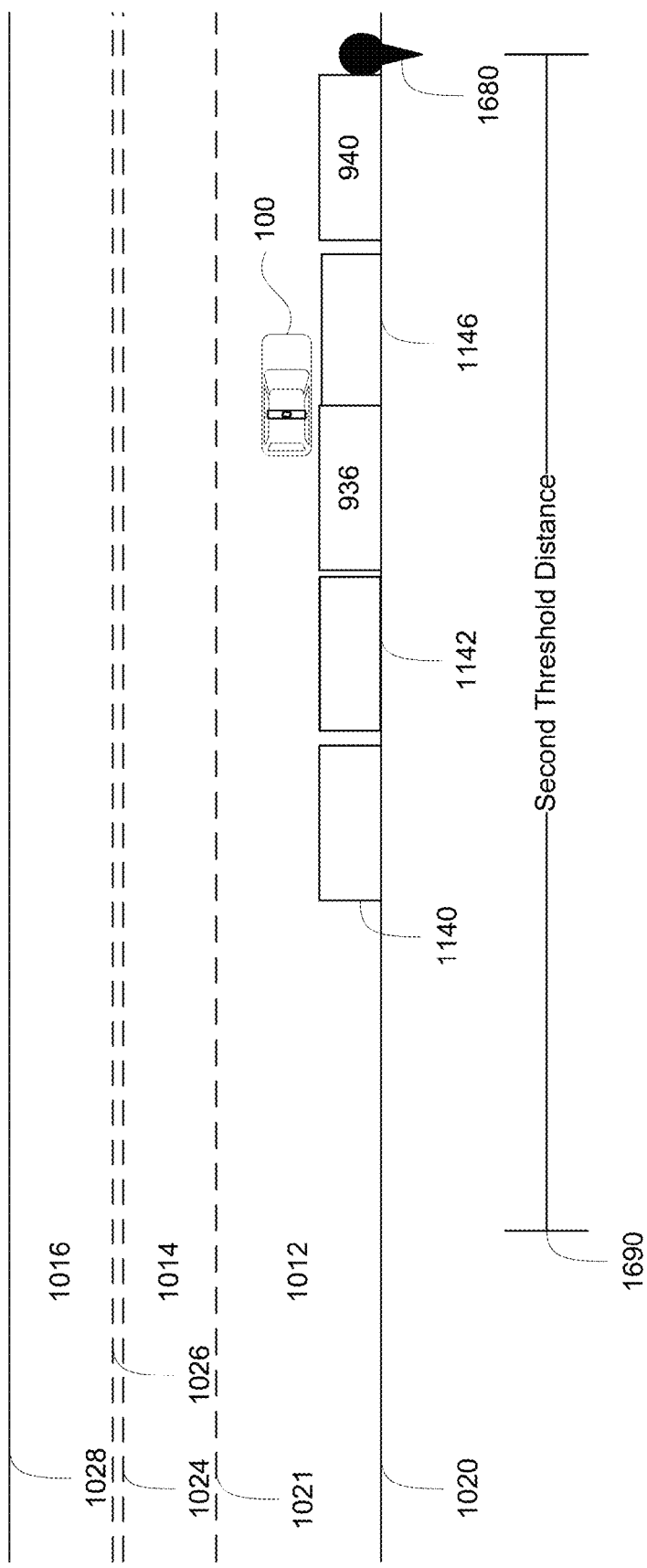
FIG. 16 is a further example bird's eye view of a geographic area and data in accordance with aspects of the disclosure.

If the vehicle is less than or within the second threshold distance from the destination location, the vehicle may be in late stage of the route. For example, as shown in FIG. 16, vehicle 100 is approaching the destination location and is within the second threshold distance represented by line 1690 from the destination location represented by marker 1680. In this stage, the response of the computing devices 110 to the signal from button 614, button 810 or the passenger's client computing device may depend on whether the computing devices have already identified a pull over spot and are attempting to maneuver the vehicle into that pull over spot. If so, the computing devices may "ignore" the signal and continue to pull the vehicle into the pull over spot. If not, the computing device may change the destination to the vehicle's current location as discussed above and stop the vehicle in the closest available location to do so under the circumstances. In some cases, this may allow the computing devices to stop the vehicle immediately, of course, depending on the current circumstances of traffic, current position and orientation of the vehicle as well as safety considerations such as the speed limit of the roadway where the vehicle is currently traveling.

In other words, the response of the computing devices 110 with respect to the example of FIG. 16 will depend whether the vehicle has reached the marker 1360 of FIG. 16. For example, if in FIG. 16 the computing devices 110 have already begun to maneuver vehicle 100 into pull over spot 936 (for instance, the vehicle 100 is being parallel parked), the computing devices may simply continue to maneuver vehicle 100 into the pull over spot 936. If in FIG. 16, the computing devices 110 are not already maneuvering the vehicle 100 into a pull over spot, the computing devices 110 may respond by maneuvering vehicle 100 to the closest available pull over spot, here pull over spot 940, or may stop within lane 1012, if safe to do so given speed limits for lane 1012 and current traffic conditions.

In some instances, data from passengers using button 614, button 810, or his or her client computing device to pull the vehicle over during the late stage may be used to improve how the computing devices 110 identify the pull over location in which to stop the vehicle for future passenger pick up or drop offs. As an example, machine learning techniques could be used to generate a model which could be used to select a "best" pull over location of all available pullover locations proximate to a pickup or destination location.

All of the aforementioned physical distances may be measured along the route or actual distance from the pickup location (i.e. a straight line). For instance, the threshold distances may be defined in time or in distance, either direct (as the crow flies) or along a route the vehicle is currently following.

In some instances, if a passenger uses one of the buttons 614 or 810, but then changes her mind, he or she may cancel the request to pull over by pressing the same button a second time or alternatively by hitting button 812. To achieve this, before actually stopping the vehicle, the computing devices may wait for a predetermined grace period, such as 1 second or more or less, for a second signal before deviating from the route and/or actually stopping or slowing the vehicle down. This allows the passenger to cancel the request and the computing devices to continue to maneuver the vehicle to the destination location without interruption. The grace period may be implemented only in certain situations, such as where the vehicle has already pulled into a lane of traffic from the pickup location.

Where the passenger decides to use his or her mobile device to request that the vehicle pull over, the response of the computing devices may be different or the same as using the buttons 614, 810. For instance, if the passenger requests a stop from his or her client computing device, the passenger may also indicate whether he or she is ending the trip early or just stopping temporarily. In this regard, a request to pull over using the client computing device may surface an optional dialog in the application that asks for the reason of the stop for data collection. This data may be used to identify additional options or reasons for stopping into the application for future strips. Additionally, when the passenger uses a button in the application to request that the vehicle pull over, the image of the button may change into a "cancel pullover request" button to make it clear that pressing this button again will cancel the request. Such an operation may or may not be possible in a vehicle with physical buttons as discussed above.

The passenger may also have an option to ask for help (from remote assistance) or provide other feedback.

The responses of the computing devices 110 to signals from the buttons 614, 810 must of course be weighed with safety and legal considerations such as whether the drop off is in a busy or quiet street, how disruptive to the flow of traffic stopping at particular locations would be, whether continuing to stop is a violation of a rule or law, etc.

The buttons 614 or 810 may also be used to "pause" a trip (i.e. so a passenger can grab a coffee), change a destination once in the vehicle, or to stop the vehicle in the case of an emergency. Of course, these situations are less preferred than those discussed above and may not be appropriate uses of these buttons.

Figure 17:
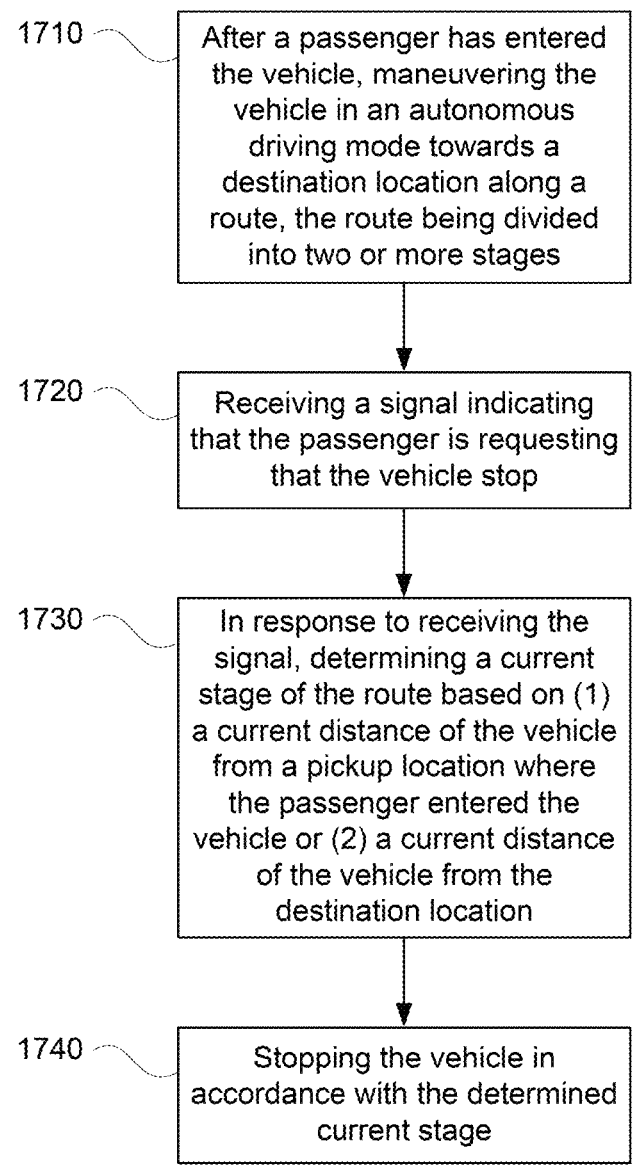
FIG. 17 is an example flow diagram in accordance with aspects of the disclosure.

FIG. 17 is an example flow diagram 1700 in accordance with some of the aspects described above that may be performed by one or more processors or computing devices such as computing devices 110. For instance, at block 1710, after a passenger has entered the vehicle, the vehicle is maneuvered by the computing devices 110 in an autonomous driving mode towards a destination location along a route. The route is divided into two or more stages. At block 1720, a signal indicating that the passenger is requesting that the vehicle stop or pull over is received by the computing devices 110. At block 1730, in response to the signal, the computing devices 110 determine a current stage of the route based on (1) a current distance of the vehicle from a pickup location where the passenger entered the vehicle or (2) a current distance of the vehicle from the destination location. At block 1740, the one or more computing devices stop the vehicle in accordance with the determined current stage.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of stopping a vehicle without a driver, the method comprising:
after a passenger has entered the vehicle, maneuvering, by one or more processors, the vehicle in an autonomous driving mode along a route from a pickup location to a destination location;
receiving, by the one or more processors, a signal indicating that the passenger is requesting that the vehicle stop or pull over;
in response to receiving the signal, determining, by the one or more processors, which one of a plurality of predetermined stages of the route in which the vehicle is currently located, the plurality of predetermined stages including a first stage where the vehicle is located within a first predetermined distance in time or space from the pickup location, a second stage where the vehicle is located more than the first predetermined distance from the pickup location and located more than a second predetermined distance in time or space from the destination location, and a third stage where the vehicle is located within the second predetermined distance of the destination location; and
stopping, by the one or more processors, the vehicle based on which one of the plurality of predetermined stages of the route in which the vehicle is determined to be currently located.

2. The method of claim 1, wherein the one of the plurality of predetermined stages of the route in which the vehicle is determined to be currently located is the first stage and the vehicle is in a parking lot where the passenger entered the vehicle, and stopping the vehicle includes stopping the vehicle at a current location of the vehicle when the signal is received.

3. The method of claim 2, further comprising, while the vehicle is stopped, waiting for the passenger to exit and reenter the vehicle.

4. The method of claim 1, wherein the one of the plurality of predetermined stages of the route in which the vehicle is determined to be currently located is the first stage, and stopping the vehicle includes stopping the vehicle at a current location of the vehicle when the signal is received.

5. The method of claim 4, further comprising, while the vehicle is stopped, waiting for the passenger to exit and reenter the vehicle.

6. The method of claim 1, wherein the one of the plurality of predetermined stages of the route in which the vehicle is determined to be currently located is the second stage, and stopping the vehicle includes:
accessing map information identifying pull over spots where the vehicle is able to stop and allow passengers to exit the vehicle;
identifying an available one of the pull over spots; and
stopping the vehicle in the available one of the pull over spots.

7. The method of claim 1, wherein the one of the plurality of predetermined stages of the route in which the vehicle is determined to be currently located is the second stage, and the method further comprises:
prior to maneuvering the vehicle towards the destination location, setting the destination location as a destination goal for the vehicle; and
setting a current location of the vehicle when the signal is received as a new destination goal for the vehicle, and wherein stopping the vehicle is further based on the new destination goal.

8. The method of claim 1, wherein the one of the plurality of predetermined stages of the route in which the vehicle is determined to be currently located is the third stage, and stopping the vehicle includes stopping the vehicle at a current location of the vehicle when the signal is received.

9. The method of claim 8, wherein when the one of the plurality of predetermined stages of the route in which the vehicle is determined to be currently located is the third stage, stopping the vehicle includes continuing the maneuvering to stop and ignoring the signal.

10. A system for stopping a vehicle without a driver, the system comprising:
one or more computing devices having one or more processors configured to:
maneuver the vehicle in an autonomous driving mode, after a passenger has entered the vehicle, along a route from a pickup location to a destination location;
receive a signal indicating that the passenger is requesting that the vehicle stop or pull over;
determine, in response to receiving the signal, which one of a plurality of predetermined stages of the route in which the vehicle is currently located, the plurality of predetermined stages including a first stage where the vehicle is located within a first predetermined distance in time or space from the pickup location, a second stage where the vehicle is located more than the first predetermined distance from the pickup location and located more than a second predetermined distance in time or space from the destination location, and a third stage where the vehicle is located within the second predetermined distance of the destination location; and
stopping the vehicle based on which one of the plurality of predetermined stages of the route in which the vehicle is determined to be currently located.

11. The system of claim 10, wherein the one of the plurality of predetermined stages of the route in which the vehicle is determined to be currently located is the first stage and the vehicle is in a parking lot where the passenger entered the vehicle, and the one or more processors are further configured to stop the vehicle by stopping the vehicle at a current location of the vehicle when the signal is received.

12. The system of claim 11, the one or more processors are further configured to, while the vehicle is stopped, waiting for the passenger to exit and reenter the vehicle.

13. The system of claim 10, wherein the one of the plurality of predetermined stages of the route in which the vehicle is determined to be currently located is the first stage, and the one or more processors are further configured to stop the vehicle by stopping the vehicle at a current location of the vehicle when the signal is received.

14. The system of claim 13, the one or more processors are further configured to, while the vehicle is stopped, wait for the passenger to exit and reenter the vehicle.

15. The system of claim 10, wherein the one of the plurality of predetermined stages of the route in which the vehicle is determined to be currently located is the second stage, and the one or more processors are further configured to stop the vehicle by:
   accessing map information identifying pull over spots where the vehicle is able to stop and allow passengers to exit the vehicle;
   identifying an available one of the pull over spots; and
   stopping the vehicle in the available one of the pull over spots.

16. The system of claim 10, wherein the one of the plurality of predetermined stages of the route in which the vehicle is determined to be currently located is the second stage, and the one or more processors are further configured to:
   prior to maneuvering the vehicle towards the destination location, set the destination location as a destination goal for the vehicle; and
   set a current location of the vehicle when the signal is received as a new destination goal for the vehicle, and wherein stopping the vehicle is further based on the new destination goal.

17. The system of claim 10, wherein the one of the plurality of predetermined stages of the route in which the vehicle is determined to be currently located is the third stage, and the one or more processors are further configured to stop the vehicle by stopping the vehicle at a current location of the vehicle when the signal is received.

18. The system of claim 10, wherein when the one of the plurality of predetermined stages of the route in which the vehicle is determined to be currently located is the third stage, the one or more processors are further configured to stop the vehicle by continuing the maneuvering to stop and ignoring the signal.

19. The system of claim 10, further comprising the vehicle.

20. A non-transitory computer-readable medium on which instructions are stored, the instructions, when executed by one or more processors, cause the one or more processors to perform a method of stopping a vehicle without a driver, the method comprising:
   after a passenger has entered the vehicle, maneuvering the vehicle in an autonomous driving mode towards a destination location along a route from a pickup location to a destination location;
   receiving a signal indicating that the passenger is requesting that the vehicle stop or pull over;
   in response to receiving the signal, determining which one of a plurality of predetermined stages of the route in which the vehicle is currently located, the plurality of predetermined stages including a first stage where the vehicle is located within a first predetermined distance in time or space from the pickup location, a second stage where the vehicle is located more than the first predetermined distance from the pickup location and located more than a second predetermined distance in time or space from the destination location, and a third stage where the vehicle is located within the second predetermined distance of the destination location; and
   stopping the vehicle based on in which one of the plurality of predetermined stages of the route in which the vehicle is determined to be currently located, and wherein when the one of the plurality of predetermined stages of the route in which the vehicle is determined to be currently located includes that the vehicle is located within the second predetermined distance and when the vehicle is determined to already be maneuvering to stop, stopping the vehicle includes continuing the maneuvering to stop and ignoring the signal.

* * * * *